United States Patent [19]
Motohashi et al.

[11] Patent Number: 5,946,670
[45] Date of Patent: Aug. 31, 1999

[54] DATA SWITCHING DEVICE AND METHOD OF NOTIFYING CHARGE INFORMATION IN DATA SWITCHING NETWORK

[75] Inventors: Daisuke Motohashi; Eiichiro Takahashi, both of Kawasaki, Japan

[73] Assignee: Fujitsu Limited, Kanagawa, Japan

[21] Appl. No.: 08/735,000

[22] Filed: Oct. 22, 1996

[30] Foreign Application Priority Data

Feb. 29, 1996 [JP] Japan ................................. 8-043308

[51] Int. Cl.⁶ ......................................... G06F 17/60
[52] U.S. Cl. .................... 705/400; 379/100.04; 379/114; 379/115; 379/134; 705/1; 709/200
[58] Field of Search ................... 364/400, 464.1; 379/100.04, 111, 114, 115, 134; 395/200.3, 201; 705/1, 400; 709/200

[56] References Cited

U.S. PATENT DOCUMENTS

| | | | |
|---|---|---|---|
| 3,427,594 | 2/1969 | Lavenir et al. | 379/115 |
| 4,837,813 | 6/1989 | Terajima | 379/100.04 X |
| 4,868,758 | 9/1989 | Kokubu | 705/400 |
| 4,891,836 | 1/1990 | Takahashi | 379/10.04 |
| 5,430,794 | 7/1995 | Ayame | 379/114 |
| 5,446,733 | 8/1995 | Tsuruoka | 370/232 |
| 5,751,799 | 5/1998 | Mori | 379/114 |
| 5,828,737 | 10/1998 | Sawyer | 379/114 |

FOREIGN PATENT DOCUMENTS 5-30132  2/1993  Japan .

Primary Examiner—Edward R. Cosimano
Attorney, Agent, or Firm—Helfgott & Karas PG

[57] ABSTRACT

A data switching device includes a switch which performs a switch operation on data transferred via the data switching device. The switch forms a permanent link connecting terminals permanently. A charge information management unit manages charge information concerning a quantity of information transferred via the permanent link. A control unit sends one of the terminals a notification message including the charge information according to a predetermined sequence.

24 Claims, 20 Drawing Sheets

F I G. 6
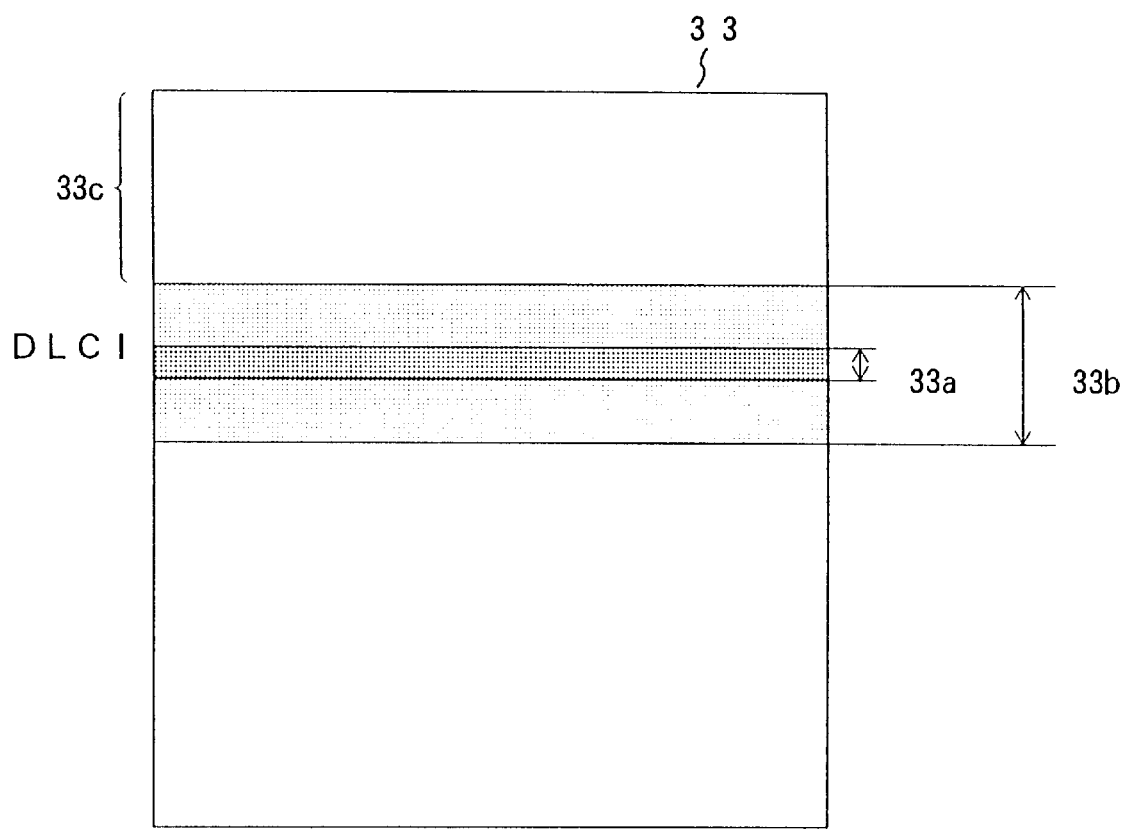

| 8 | 7 | 6 | 5 | 4 | 3 | 2 | 1 |
|---|---|---|---|---|---|---|---|
| 0 | 1 | 1 | \multicolumn{5}{c}{Message Type(STATUS ENQuiry) 1 0 1 0 1} |
| 0 | 1 | 0 | 1 | 0 | 0 | 0 | 1 |
| \multicolumn{8}{c}{Length of report type contents} |
| \multicolumn{8}{c}{Type of report(STATUS ENQuiry)   21a-1} |
| 0 | 1 | 0 | 1 | 0 | 0 | 1 | 1 |
| \multicolumn{8}{c}{Length of link integrity verification contents} |
| \multicolumn{8}{c}{Send sequence number} |
| \multicolumn{8}{c}{Receive sequence number} |

| 8 | 7 | 6 | 5 | 4 | 3 | 2 | 1 |
|---|---|---|---|---|---|---|---|
| 0 | 1 | 1 | 1 | Message Type(STATUS ENQuiry) 0 1 0 1 | | | |
| 0 | 1 | 0 | 1 | 0 | 0 | 0 | 1 |
| Length of report type contents | | | | | | | |
| 0 | 0 | Type of report(CHARGE ENQuiry) 0 0 0 0 1 1 | | | | | 21b-1 |
| 0 | 1 | 0 | 1 | 0 | 0 | 1 | 1 |
| Length of link integrity verification contents | | | | | | | |
| Send sequence number | | | | | | | |
| Receive sequence number | | | | | | | |

| 8 | 7 | 6 | 5 | 4 | 3 | 2 | 1 |
|---|---|---|---|---|---|---|---|
| 0 | 1 | 1 | \multicolumn{4}{c}{Message Type(STATUS)} | |
| | | | 1 | 1 | 1 | 0 | 1 |
| 0 | 1 | 0 | 1 | 0 | 0 | 0 | 1 |
| \multicolumn{8}{c}{Length of report type contents} |
| \multicolumn{8}{c}{Type of report} |
| 0 | 1 | 0 | 1 | 0 | 0 | 1 | 1 |
| \multicolumn{8}{c}{Length of link integrity verification contents} |
| \multicolumn{8}{c}{Send sequence number} |
| \multicolumn{8}{c}{Receive sequence number} |
| 0 | 1 | 0 | 1 | 0 | 1 | 1 | 1 |
| \multicolumn{8}{c}{Length of PVC status contents} |
| 0 | 0 | \multicolumn{6}{c}{DataLink connection identifier(DLCI)} |
| 1 | \multicolumn{4}{c|}{DataLink connection identifier} | 0 | 0 | 0 |
| 1 | 0 | 0 | 0 | N | D | A | 0 |
| 1 | \multicolumn{7}{c}{Charging Information} |
| 1 | | | | | | | |

| 8 | 7 | 6 | 5 | 4 | 3 | 2 | 1 |
|---|---|---|---|---|---|---|---|
| 0 | 1 | 1 | \multicolumn{5}{c|}{Message Type(STATUS)} |
| | | | 1 | 1 | 1 | 0 | 1 |
| 0 | 1 | 0 | 1 | 0 | 0 | 0 | 1 |
| \multicolumn{8}{c|}{Length of report type contents} |
| \multicolumn{8}{c|}{Type of report(CHARGE)    21d-2} |
| 0 | 0 | 0 | 0 | 0 | 1 | 0 | 0 |
| 0 | 1 | 0 | 1 | 0 | 0 | 1 | 1 |
| \multicolumn{8}{c|}{Length of link integrity verification contents} |
| \multicolumn{8}{c|}{Send sequence number} |
| \multicolumn{8}{c|}{Receive sequence number} |
| 0 | 1 | 0 | 1 | 0 | 1 | 1 | 1 |
| \multicolumn{8}{c|}{Length of PVC status contents} |
| 0 | 0 | \multicolumn{6}{c|}{DataLink connection identifier(DLCI)} |
| 1 | \multicolumn{4}{c|}{DataLink connection identifier} | 0 | 0 | 0 |
| 1 | 0 | 0 | 0 | N | D | A | 0 |
| 1 | \multicolumn{7}{c|}{Charging Information} |
| 1 | | | | | | | 21d-1 |

} MAY BE OMITTED

DATA SWITCHING DEVICE AND METHOD OF NOTIFYING CHARGE INFORMATION IN DATA SWITCHING NETWORK

BACKGROUND OF THE INVENTION

1. Field of the Invention

The present invention generally relates to data switching devices, and more particularly a data switching device which employs a quantity-dependent charging method in which the charge is accounted based on the quantity of user information transferred between subscribers. More specifically, the present invention is concerned with a high-speed relay network such as a frame relay switching network using a permanent virtual connection (PVC) link or a cell relay switching network (an asynchronous transfer mode (ATM) network) in which the charge is accounted based on the quantity of user information transferred between the subscribers. Furthermore, the present invention relates to a method of notifying the subscriber of the charge at a given timing after the communication is completed.

Recently, there has been an increasing demand for data switching networks and a requirement of speeding up a data transfer. In such a situation, there has been a considerable activity in the research and development of a high-speed relay switching network which should be replaced by a conventional packet switching network.

Currently working high-speed relay switching networks such as a frame relay switching network and a cell relay switching network provide PVC services in which a link (PVC link) is permanently established between specific subscribers. In the PVC link, a virtual pass identifier (VPI) and a virtual connection identifier (VCI) are fixed. The charge accounted by transferring data via a PVC link is fixed irrespective of the quantity of data actually transferred. There is another charge accounting method based on the quantity of data actually transferred. Such a charge accounting method is called quantity-dependent charge accounting.

In the conventional high-speed relay switching networks, there is no way to immediately notify the sender subscriber of the charge for the communication just completed. Usually, the subscriber is notified of the total charge at a given interval. Hence, it is desired that the subscriber is immediately notified of the charge for the just completed communication.

2. Description of the Prior Art

FIG. 1 is a block diagram of a system having a frame relay network 1 to which frame relay terminals 3A and 3B are connected. PVC links are formed between the frame relay terminals 3A and 3B. For example, a PVC link is formed between the terminal A and B in which there are formed a link identified by DLCI (Data Link Connection Identifier) "i" of a physical line between the terminal A and the network 1 and a link identified by DLCI "m" of a physical line between the terminal B and the network 1.

FIG. 2 is a diagram showing a conventional charge accounting system in the system shown in FIG. 1. The frame relay network 1 includes frame relay switches 9a and 9b. The sender terminal A and the receiver terminal D are connected via a link formed by the frame relay switches 9a and 9b. It should be noted that a SVC (Switched Virtual Connection) link is also employed in the conventional high-speed relay networks. The SVC link is established by specifying a destination subscriber each time a sender subscriber starts to a communication with the destination subscriber. On the other hand, in a communication via the PVC link, a destination subscriber is known before starting the communication.

In FIG. 2, the terminals A and D can communicate with either a SVC link or a PVC link. The charge accounting is carried out in the frame relay switch 9a directly connected to the sender terminal A. Information concerning charge accounting (the quantity of data transferred to the destination terminal D) is transferred from the frame relay switch 9b to the frame relay switch 9a by an in-network control signal indicated by a broken line shown in FIG. 2.

According to the UNI (User Network Interface) defined by Recommendation ITU-T COM 7-R 33-E (the disclosure of which is hereby incorporated by reference), a disconnect message is defined for a protocol of the SVC link. The disconnect message can contain information concerning the charge accounting. Hence, the sender subscriber A can immediately be notified of the charge for the communication by the disconnect message.

On the other hand, a disconnect message is not defined in a protocol of the PVC link. Hence, the sender subscriber A using the PVC link do not have any way to receive information concerning the charge for a communication immediately after the communication is completed.

SUMMARY OF THE INVENTION

It is a general object of the present invention to provide a data switching device and a method of immediately notifying a charge in a data switching network in which the above problems are eliminated.

A more specific object of the present invention is to provide a data switching device and a method of notifying a charge for a communication of a sender subscriber via a PVC link immediately after the communication is completed or at a desired timing.

The above objects of the present invention are achieved by a data switching device comprising: a switch which performs a switch operation on data transferred via the data switching device, the switch forming a permanent link connecting terminals permanently; a charge information management unit which manages charge information concerning a quantity of information transferred via the permanent link; and a control unit which sends one of the terminals a notification message including the charge information according to a predetermined sequence. In this case, the control unit may send the notification message in response to receipt of an enquiry message periodically sent from the above one of the terminals. Alternatively, the enquiry message may be a message which enquiries a status of the permanent link. The enquiry message may be a message which enquiries a charge for a transfer of information.

The control unit may send the notification message when a status of the permanent link changes. The control unit may send the notification message in response to receipt of an enquiry message periodically sent from the above one of the terminals.

The control unit may send the notification message when a sequence number contained in a message sent from the above one of the terminals to the data switching device reaches a predetermined value.

The control unit may send the notification message at a given interval.

The control unit may send the notification message at the given interval in response to receipt of an enquiry message sent from the above one of the terminals.

The control unit may send the notification message at a given time. In this case, the control unit may send the notification message at the given time in response to receipt of an enquiry message sent from the above one of the terminals.

The charge information may indicate a charge for information transferred since a last notification of the charge information.

The above-mentioned objects of the present invention are also achieved by a charge information notifying method for a network including a data switching device including a switch which performs a switch operation on data transferred via the data switching device, the switch forming a permanent link connecting terminals permanently, the method comprising the steps of: (a) managing charge information concerning a quantity of information transferred via the permanent link; and (b) sending one of the terminals a notification message including the charge information according to a predetermined sequence.

The step (a) may comprise a step of sending the notification message in response to receipt of an enquiry message periodically sent from the above one of the terminals. In this case, the enquiry message may be a message which enquiries a status of the permanent link. Alternatively, the enquiry message may be a message which enquiries a charge for a transfer of information.

The step (b) may comprise a step of sending the notification message when a status of the permanent link changes. In this case, the step (b) may comprise a step of sending the notification message in response to receipt of an enquiry message periodically sent from the above one of the terminals.

The step (b) may comprise a step of sending the notification message when a sequence number contained in a message sent from the above one of the terminals to the data switching device reaches a predetermined value.

The step (b) may comprise a step of sending the notification message at a given interval. In this case, the step (b) may comprise a step of sending the notification message at the given interval in response to receipt of an enquiry message sent from the above one of the terminals.

The step (b) may comprise a step of sending the notification message at a given time. In this case, the step (b) may comprise a step of sending the notification message at the given time in response to receipt of an enquiry message sent from the above one of the terminals.

The charge information may indicate a charge for information transferred since a last notification of the charge information.

BRIEF DESCRIPTION OF THE DRAWINGS

Other objects, features and advantages of the present invention will become more apparent from the following detailed description when read in conjunction with the accompanying drawing, in which:

FIG. 6 is a diagram of a format of accounting meter information used in the frame relay service;

FIG. 7 is a diagram of a format of a PVC status enquiry message used in the embodiment of the present invention;

FIG. 8 is a diagram of a format of a PVC charge enquiry message used in the embodiment of the present invention;

FIG. 9 is a diagram of a format of a PVC status notification message used in the embodiment of the present invention;

FIG. 10 is a diagram of a format of a PVC charge notification message used in the embodiment of the present invention;

DETAILED DESCRIPTION OF THE PREFERRED EMBODIMENTS

Before describing an embodiment of the present invention, some technical terms will now be defined.

A data link connection identifier (DLCI) is a logical identifier for defining a logical relation between a terminal and a network when executing a logical connection from the data link layer (layer 2) to an upper layer (network layer). A frame is the unit of a transfer of information. A frame relay is a data relay and switching for executing data multiplexing in the data link layer. The protocol of the frame relay is described in DL-CORE protocol of the aforementioned Recommendation issued by ITU-T, and includes a status management protocol called local management interface (LMI).

Figure 3:
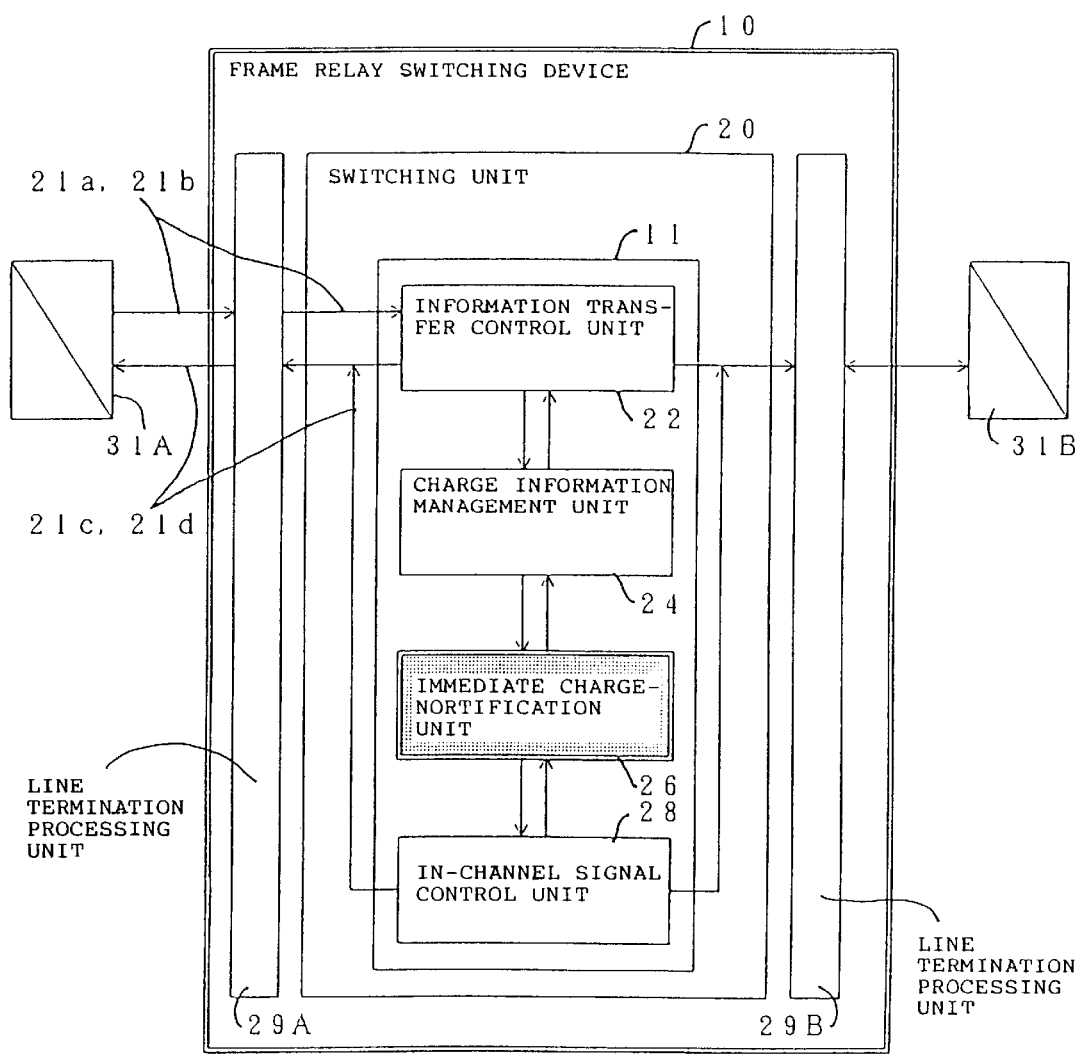
FIG. 3 is a block diagram of a data switching device according to an embodiment of the invention.

FIG. 3 is a block diagram functionally showing a frame relay switching device 10 according to an embodiment of the present invention. The frame relay switching device 10 is capable of notifying a quantity-dependent charge for a communication of a sender subscriber via a PVC link immediately after the communication is completed or at a desired timing. The above capability of the frame relay switching device 10 is accomplished by using messages 21a, 21b, 21c and 21d. As will be described in detail later, the message 21a is a PVC status enquiry message, and the message 21b is a PVC charge enquiry message. Further, the message 21c is a PVC status notification message (which may simply be referred to as a PVC status message), and the message 21d is a PVC charge notification message.

The frame relay switching device 10 includes a switching unit 20, and line termination processing units 29A and 29B.

The switch unit 20 includes a block 11 relating to charge accounting. The block 11 includes an information transfer control unit 22, a charge information management unit 24, an immediate charge-notification unit 26, and an in-channel signal control unit 28.

Figure 4:
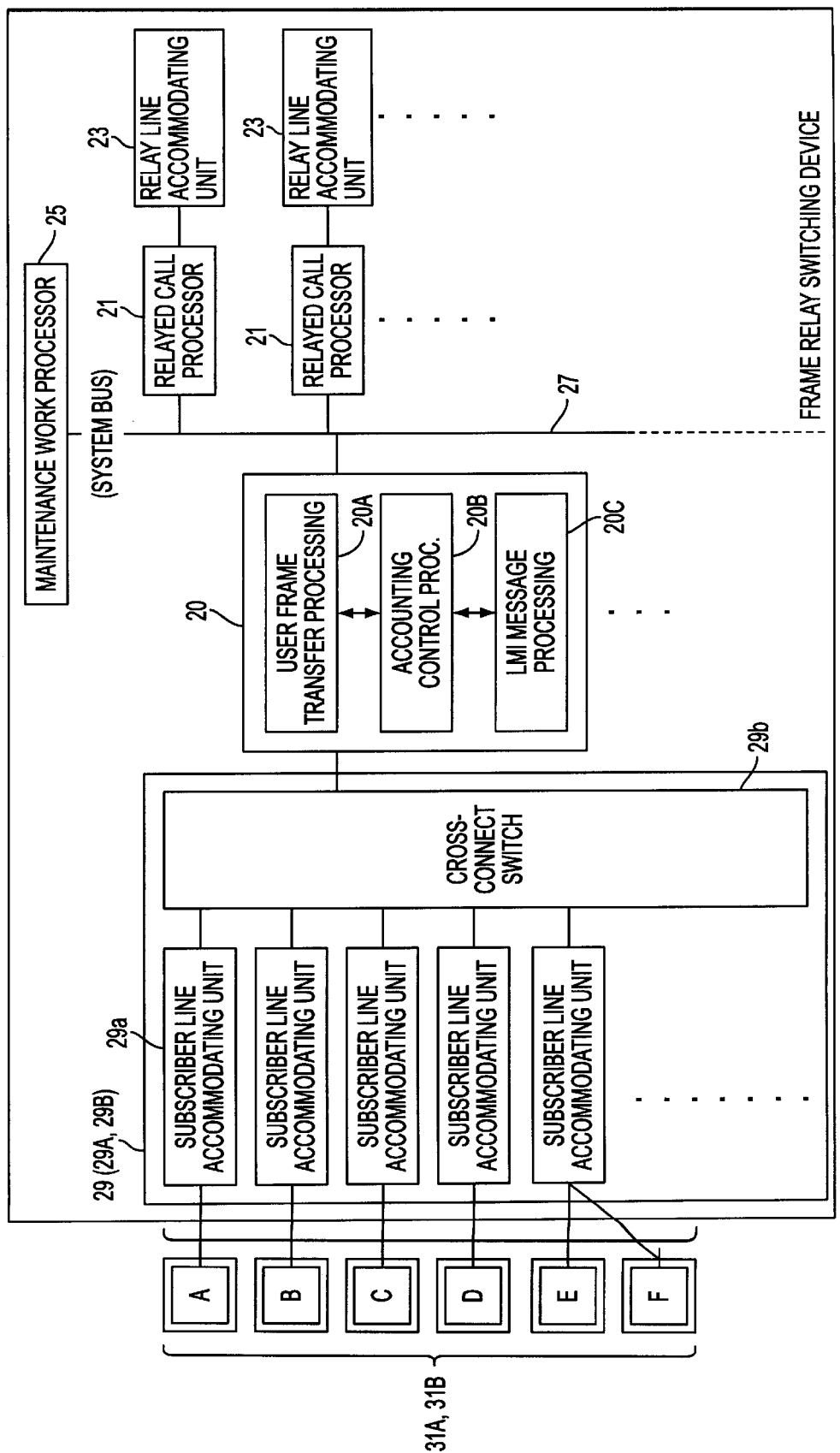
FIG. 4 is a block diagram of a hardware structure of the data switching device shown in FIG. 3.

FIG. 4 is a block diagram of a hardware structure of the frame relay switching device 10. The frame relay switching device 10 includes the switching unit 20, an interface block 29 including the line termination processing units 29A and 29B, relayed call processors 21, relay line accommodating units 23, a maintenance work processor 25, and a system bus 27. The switching unit 20 is called a subscriber call processor, and includes a user frame transfer processing block 20A, an accounting control processing block 20B and an LMI (Local Management Interface) message processing block 20C. The blocks 20A and 20B correspond to the units 22 and 24 shown in FIG. 3, respectively, and the block 20C corresponds to the units 26 and 28 shown in FIG. 3. The interface block 29 includes subscriber line accommodating units 29a, and a cross-connect switch 29b.

The user frame transfer processing block 20A transfers a user data frame from a subscriber. When the block 20A sends a user frame (which may simply be referred to as frame) to a subscriber line, the block 20A communicates with the block 20B and performs a process related to the quantity-dependent accounting, as will be described in detail later. The accounting control processing block 20B performs the quantity-dependent accounting for each transmit frame, and an in-network control for sending account information concerning a frame to a switching device (station) required to perform the quantity-dependent accounting for the above frame. Further, the accounting control processing block 20B provides the LMI message processing block 20C with immediate charge-notification information. The LMI message processing block 20C performs a PVC status confirmation interface process by an LMI message, as will be described in detail later.

The block 20 will now be described in more detail by explaining the functions of the units 22, 24, 26 and 28 shown in FIG. 3.

The information transfer control unit 22 is connected to the line termination processing units 29A and 29B, and the charge information management unit 24. The unit 22 controls a transfer of information that takes place between terminals 31A and 31B. The charge information management unit 24 is connected to the information transfer control unit 22 and the immediate charge-notification control unit 26, and generates charge information based on the quantity of user information transferred between the terminals 31A and 31B. The terminals 31A and 31, which may be workstations, personal computers or the like, are capable of executing various applications.

The immediate charge-notification control unit 26 is connected to the charge information management unit 24 and the in-channel signal control unit 28, and generates an immediate charge-notification information element to be included in the PVC charge notification message 21d shown in FIG. 3. Further, the unit 26 edits the PVC status notification message 21c or the PVC charge notification message 21d so that it includes the immediate charge-notification information element (mapping process). The immediate charge-notification control unit 26 contributes to making it possible to notifying a quantity-dependent charge for a communication of a sender subscriber via a PVC link immediately after the communication is completed or at a desired timing.

The in-channel signal control unit 28 is connected to the immediate charge-notification control unit 26, the information transfer control unit 22 and the line termination processing units 29A and 29B, and sends the PVC status notification message 21c or the PVC charge notification message 21d in each of which message the immediate charge-notification information element generated by the unit 26 is included.

Figure 1:
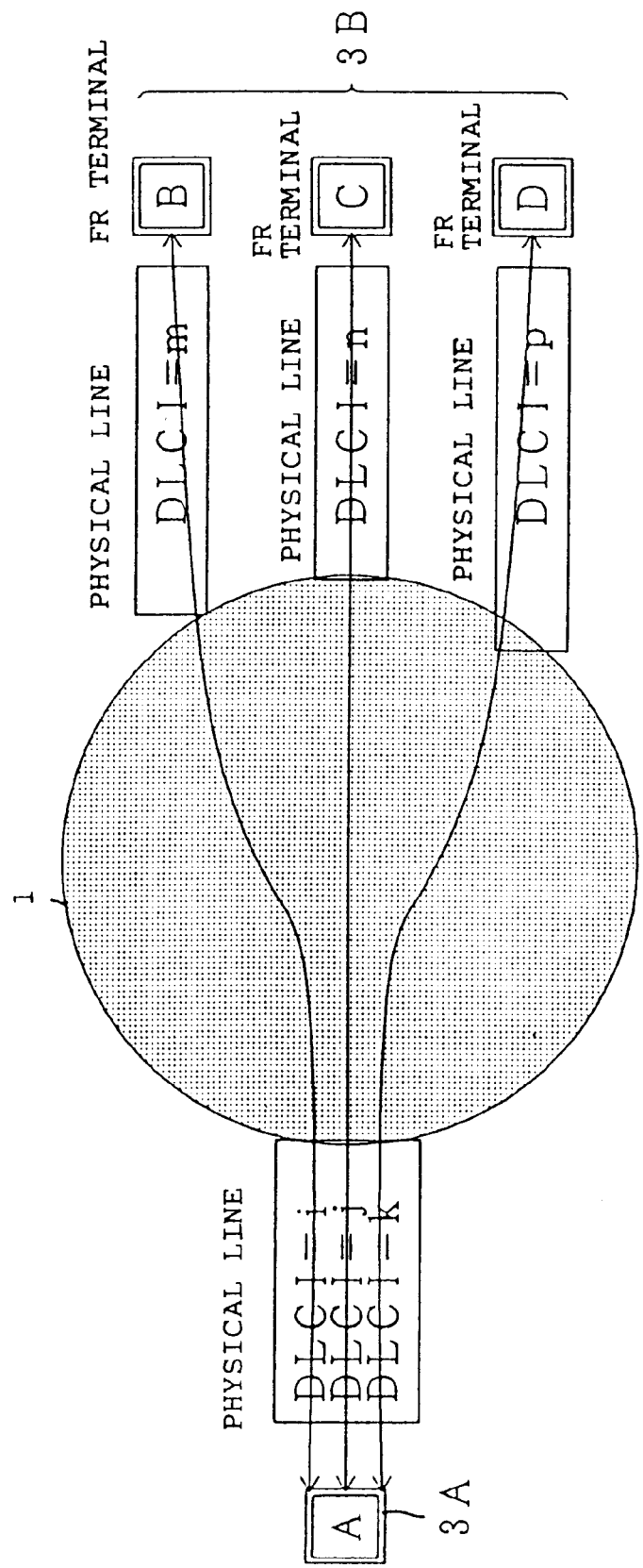
FIG. 1 is a block diagram of a system using a frame relay network.
Figure 2:
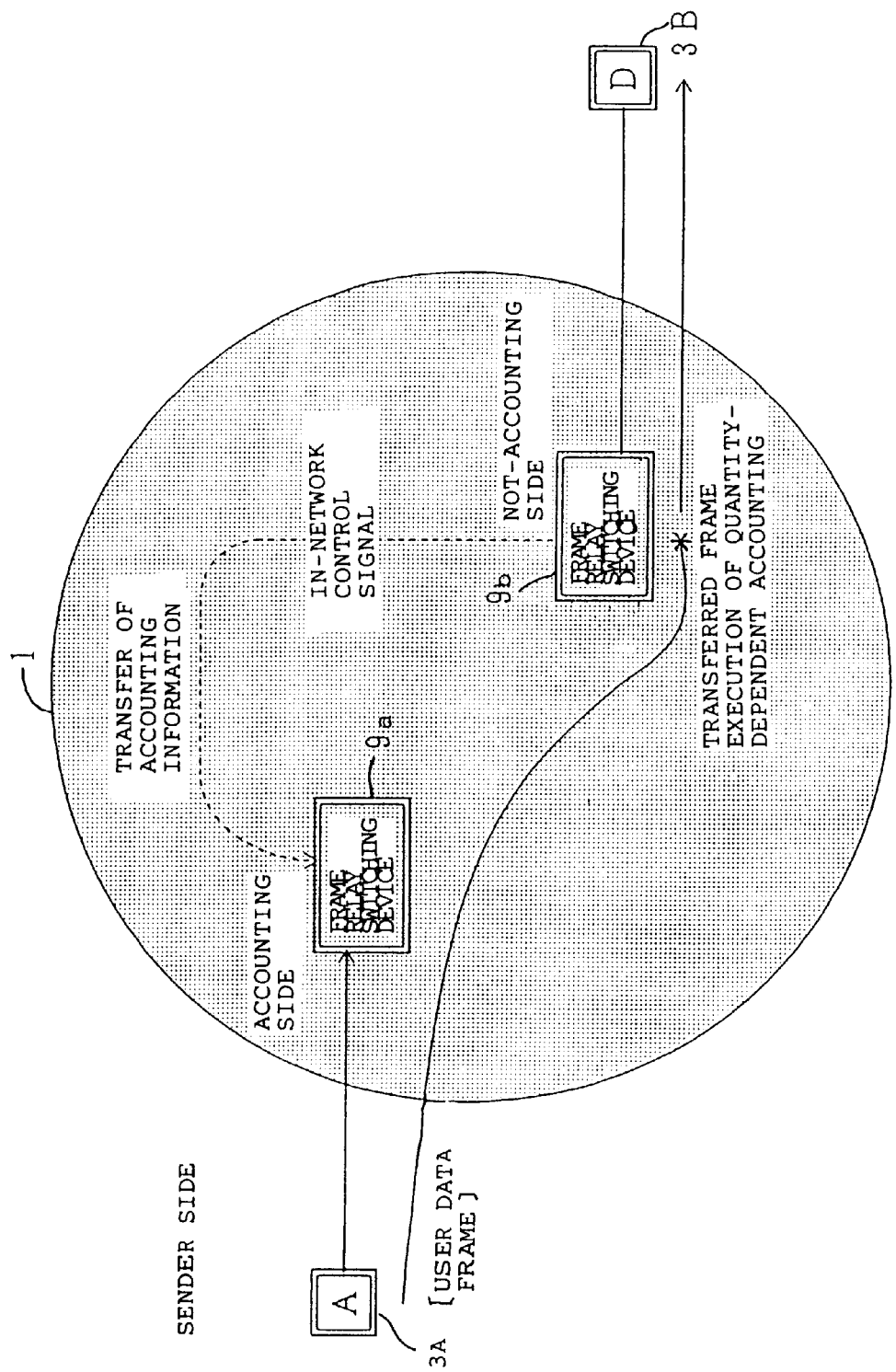
FIG. 2 is a block diagram of a conventional method of accounting the charge for a communication.

A description will now be given of frame formats used in the system shown in FIGS. 1 and 2.

Figure 5:
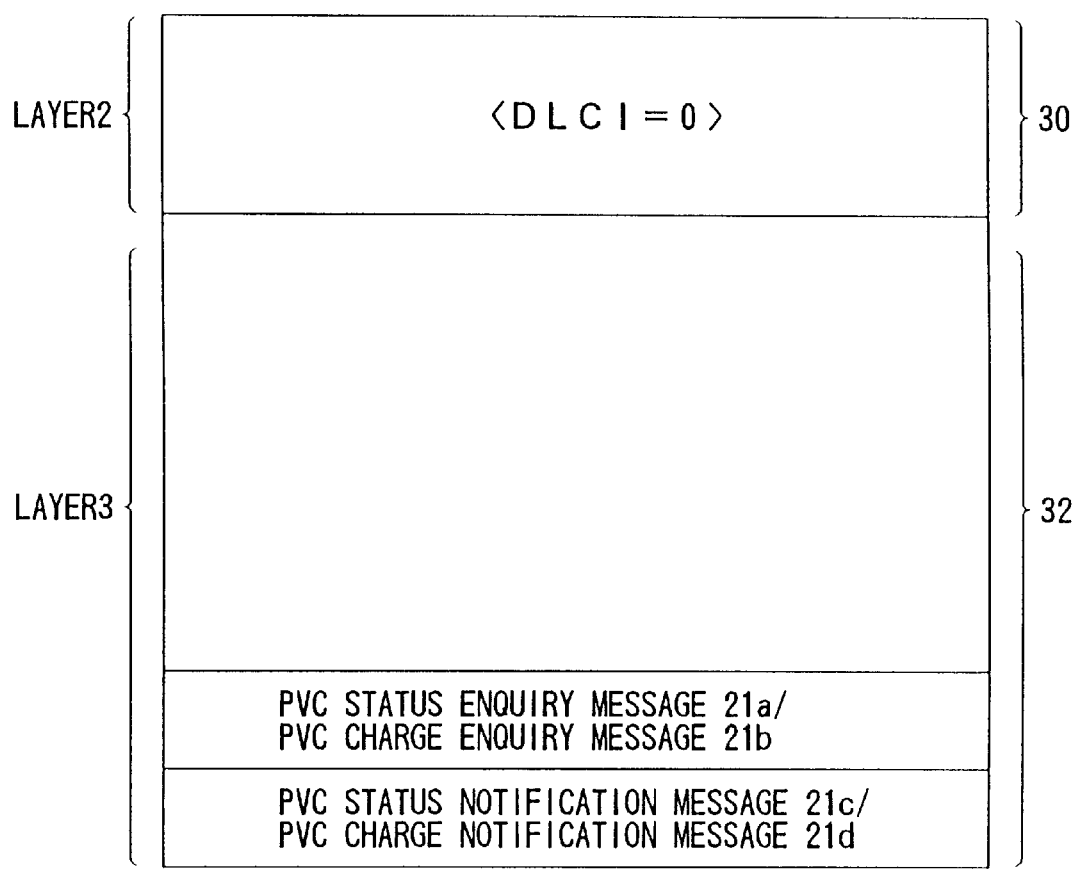
FIG. 5 is a diagram of a frame format used in a frame relay service employed in the embodiment of the present invention.

FIG. 5 shows a frame format used in the frame relay service executed in the immediate charge-notification device 11. The frame shown in FIG. 5 includes layer 2 and layer 3. The layer 2 functions as a frame heater area 30, and the layer 3 functions as a message area 32. In the message area 32, there is provided an area in which the PVC status enquiry message 21a or the PVC charge enquiry message 21b can be stored (mapping), and another area in which the PVC status notification message 21c or the PVC charge notification message 21d can be stored. The subscriber terminals A–F shown in FIG. 4 can send the enquiry messages 21a and 21b to the frame relay switching device and receive the notification messages 21c and 21d therefrom by using the frame format shown in FIG. 5 used in the frame relay services.

FIG. 6 shows a format 33 used in charging meter information used in the frame relay service. The format 33 includes an area in which charging meter information 33b managed for each subscriber can be stored. The charging meter information 33b for a desired subscriber is indicated by subscriber normalized number data 33c provided in the top of the frame 33. The subscriber normalized number data 33c includes the numbers respectively assigned to the subscribers. The charging meter information 33b contains DLCI-based charging meter information 33a managed by each number of the DLCI. The format 33 is stored in the charge information management unit 24 shown in FIG. 3.

FIG. 7 shows a format of the PVC status enquiry message 21a used in the immediate charge-notification device 11. The format shown in FIG. 7 is defined in Recommendation ITU-T COM 7-R 33-E. The PVC status enquiry message 21 includes an area in which a type-of-report information element 21a-1 is stored. The type-of-report information element 21a-1 indicates the type of enquiry requested in the PVC status enquiry message 21a. According to the embodiment of the present invention, the aforementioned PVC status enquiry message 21 is used when the subscriber terminal requests the associated frame relay switching device to send data indicative of the charge of a communication, for example, at a desired interval.

FIG. 8 shows a format of the PVC charge enquiry message 21b used in the immediate charge-notification device 11. The format shown in FIG. 8 includes is the same as that shown in FIG. 7 except that a PVC charge enquiry element 21b-1 is stored instead of the type-of-report information element 21a-1 shown in FIG. 7. The PVC charge enquiry message 21b is used when the subscriber terminal requests the associated frame relay switching device to send data indicative of the charge of a communication, for example, immediately after the communication is completed.

FIG. 9 shows a format of the PVC status notification message 21c used in the immediate charge-notification device 11. The format shown in FIG. 9 includes a part defined in Recommendation ITU-T COM 7-R 33-E, and another part provided according to the embodiment of the present invention. More particularly, the PVC status notification message 21c includes an area in which an immediate charge-notification element 21c-1 (which may simply be referred to as charging information 21c-1) is stored. The above area is mapped in a lower part of the PVC status notification message 21c. The frame relay switching device can send the PVC status notification message 21c to the subscriber terminal which sends the PVC status enquiry message thereto. Hence, the subscriber can be notified of the charge.

FIG. 10 shows a format of the PVC charge notification message 21d used in the immediate charge-notification device 11. The format shown in FIG. 10 is the same as that shown in FIG. 9 except that a PVC charge notification element 21d-2 is stored instead of the type-of-report information element shown in FIG. 9. An immediate charge-notification element 21d-1 is provided in the same manner as the immediate charge-notification element 21c-1 shown in FIG. 9.

A description will now be given of operations of the embodiment of the present invention. As will be described below, the embodiment of the present invention operates in the five different manners.

Figure 11:
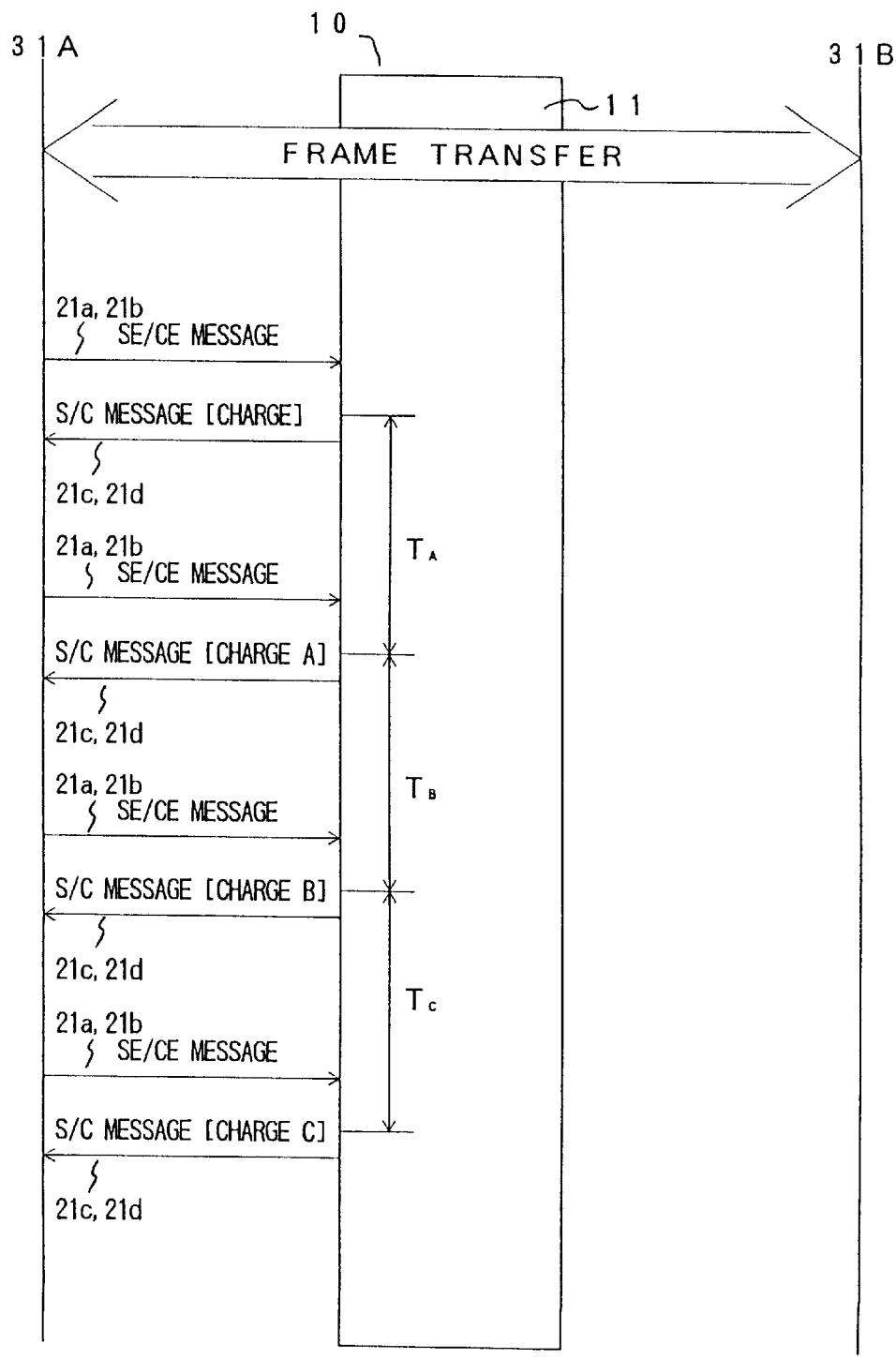
FIG. 11 is a sequence chart of a first operation of the embodiment of the present invention.
Figure 12:
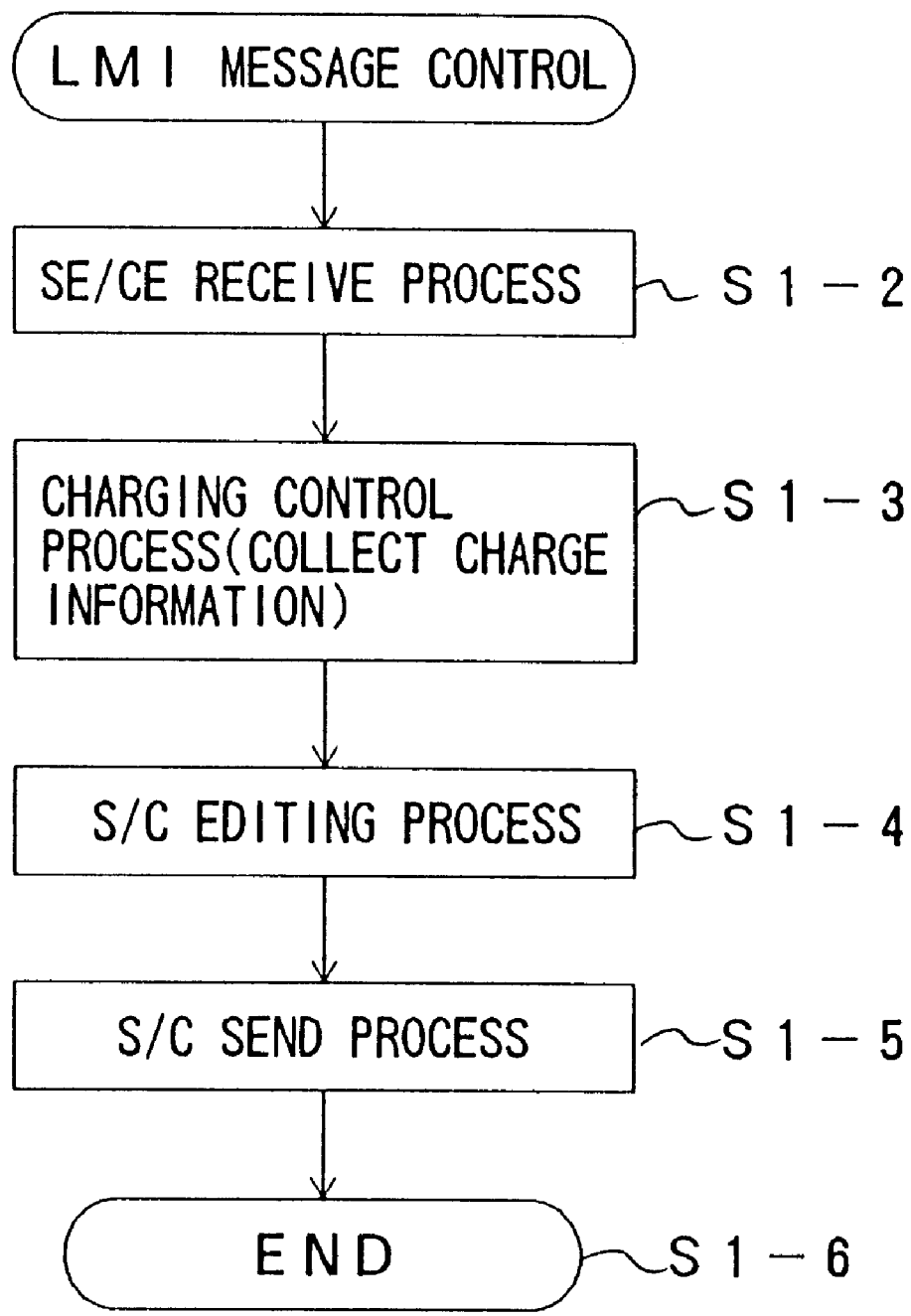
FIG. 12 is a flowchart of a control process for realizing the first operation shown in FIG. 11.

FIG. 11 is a sequence chart showing the first operation, and FIG. 12 is a flowchart of an immediate charge-notification control realizing the sequence shown in FIG. 11 by the immediate charge-notification device 11. The sequence is executed under the control of the LMI message processing block 20C shown in FIG. 4 (more particularly, the in-channel signal control unit 28 provided therein).

As shown in FIG. 11, the terminal 31A, which is connected to the terminal 31B via the PVC link, periodically sends the PVC status enquiry message 21a or the PVC charge enquiry message 21b to the immediate charge-notification device 11. In FIG. 11, the message 21a or 21b is sent at identical intervals $T_A$, $T_B$ and $T_C$ ($T_A=T_B=T_C$). When the in-channel signal control unit 28 provided in the LMI message processing block 20c receives the message 21a or 21b at step S1-2, the in-channel signal control unit 28 starts the LMI message control process. In FIG. 12, the PVC status enquiry message 21a is denoted as SE, and the PVC charge enquiry message 21b is denoted as CE.

Next, the in-channel signal control unit 28 notifies the immediate charge-notification control unit 26 of receipt of the message 21a or 21b, so that the unit 26 executes the charging control process at step S1-3. In the charging control process, the charge information management unit 24 provided in the charge process control block 20B receives information concerning the quantity of information transferred via the information transfer control unit 22 between the receipt of the message 21a or 21b and the previous receipt of the message 21a or 21b, and generates charge information based on the quantity of information. As has been described previously, the quantity of information is managed for each frame.

At S1-4, the immediate charge-notification control unit 26 generates the immediate charge-notification element 21c-1 or the immediate charge-notification element 21d-1, and edits the PVC status notification message 21c or the PVC charge notification message 21d so that the element 21c-1 or 21d-1 is included in the message 21c or 21d. In FIG. 12, the message 21c is denoted as S, and the message 21d is denoted as C.

At step S1-5, the in-channel signal control unit 28 receives the PVC status notification message 21c or the PVC charge notification message 21d from the immediate charge-notification unit 26, and sends it to the terminal 31A. Then, the in-channel signal control unit 28 ends the LMI message control process at step S1-6.

The steps S1-3 through S1-6 are repeatedly carried out each time the PVC status enquiry message 21a or the PVC charge enquiry message 21b is received. In FIG. 11, the terminal 31A is periodically notified of charges A, B and C respectively relating to the quantity of information transferred during the periods $T_A$, $T_B$ and $T_C$. The charges A, B and C may be indicative of the accumulated charges. For example, the charge C may be based on the quantity of information transferred during the sum of the periods $T_A$, $T_B$ and $T_C$.

In the first operation, it is possible for the terminal 31A to send the PVC charge enquiry message 21b immediately after the corresponding communication is completed. Upon receipt of this message, the PVC charge notification message 21d can be sent to the terminal 31A.

According to the first operation of the embodiment of the present invention, the terminal 31A can be periodically notified of the charge information. The PVC status notification message 21c or the PVC charge notification message 21d is sent to the terminal 31A in response to receipt of the PVC status enquiry message 21a or the PVC charge enquiry message 21b sent therefrom. In this regard, the charge notification process according to the first operation can be said a synchronous process.

Figure 13:
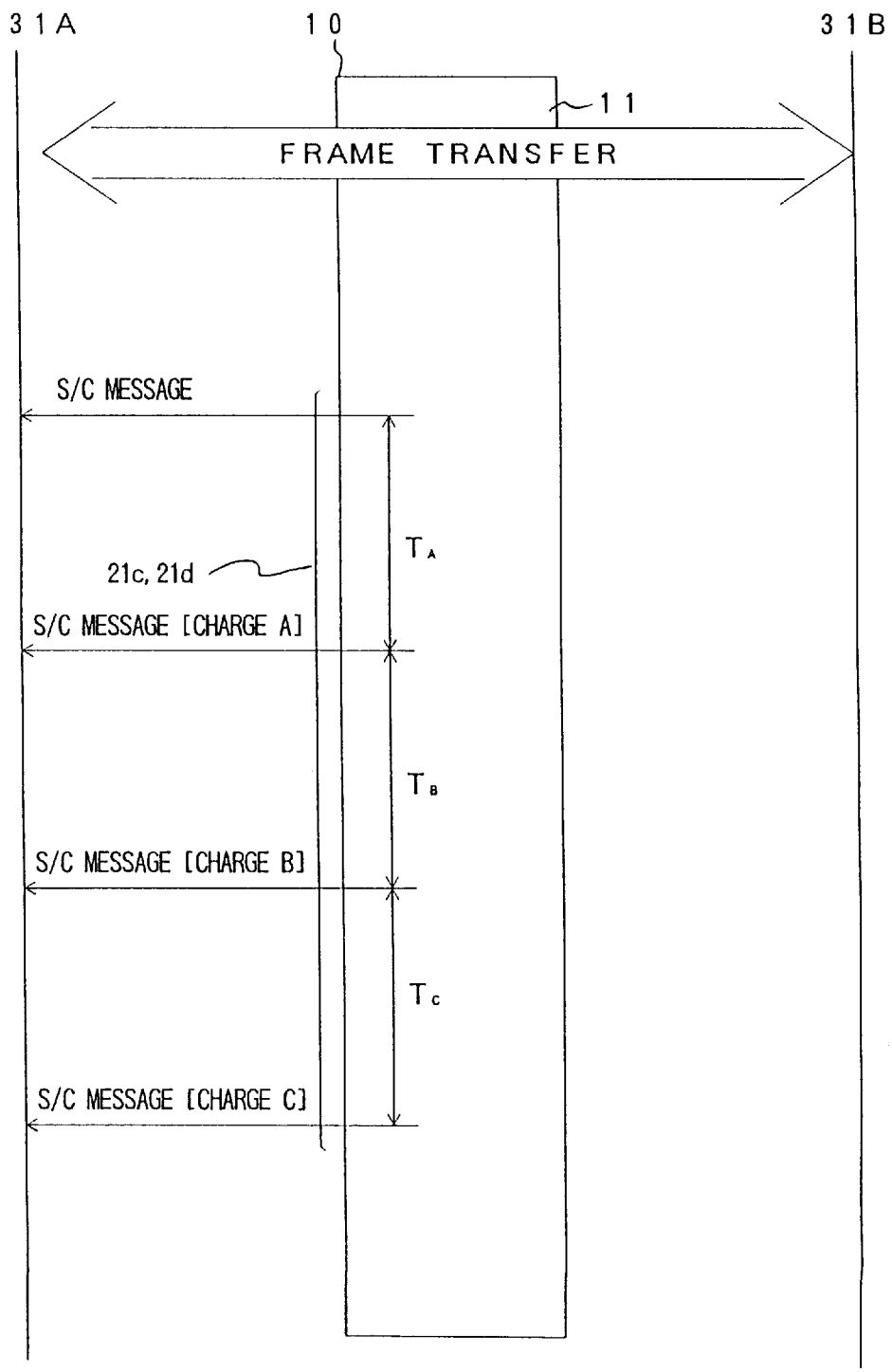
FIG. 13 is a sequence chart of a second operation of the embodiment of the present invention.
Figure 14:
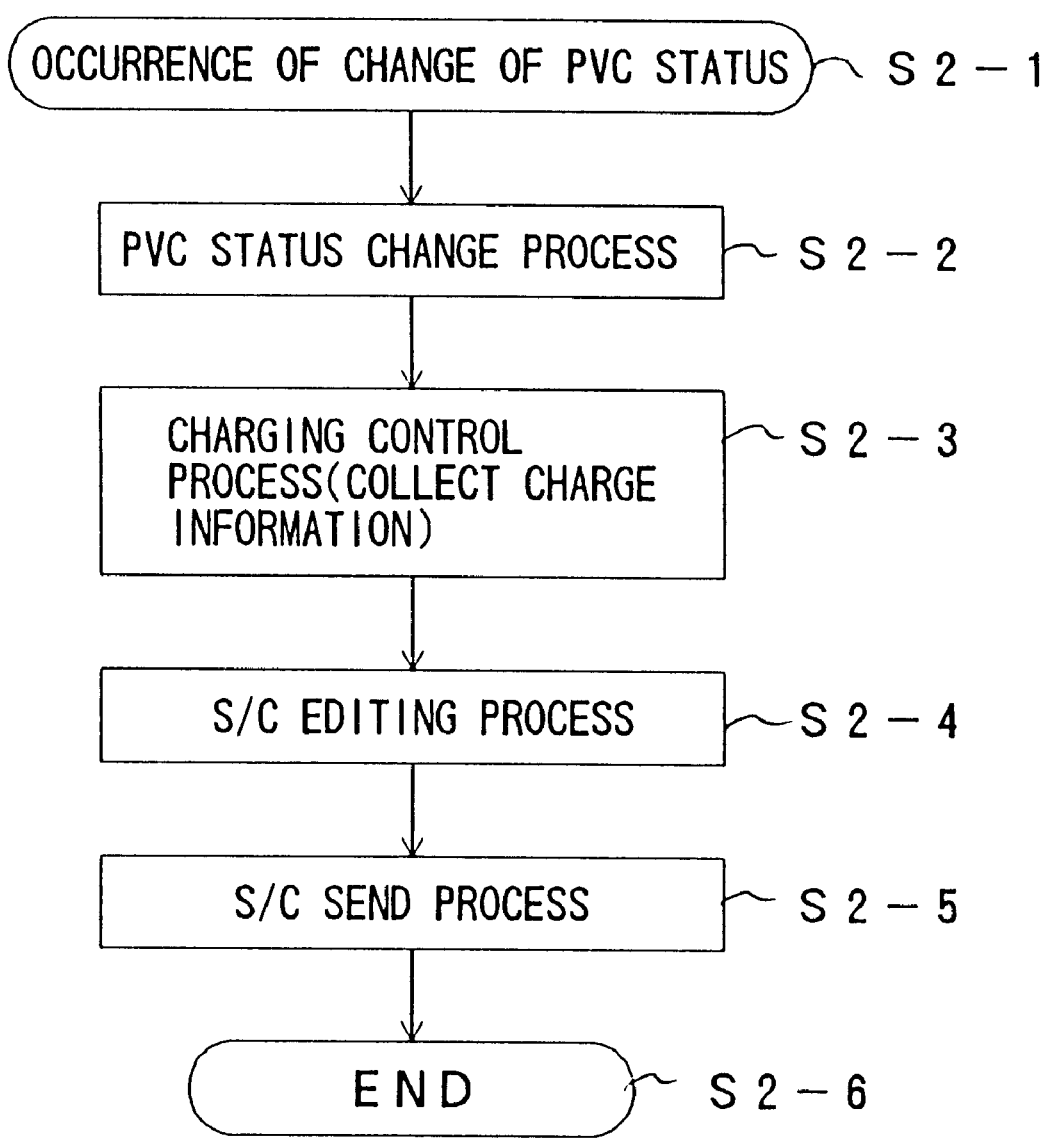
FIG. 14 is a flowchart of a control process for realizing the second operation shown in FIG. 13.

FIG. 13 is a sequence chart of the second operation of the embodiment of the present invention, and FIG. 14 is a flowchart of an immediate charge-notification control process for realizing the sequence shown in FIG. 13. The second operation does not use the PVC status enquiry message 21a and the PVC charge enquiry message 21b. The terminal 31A is asynchronously notified of the charge when a change of the status of the PVC link connecting the terminals 31A and 31B occurs.

At step S2-1, a change of the status of the PVC link occurs. For example, the PVC link is changed to the communication impossible status in which a communication cannot take place via the PVC link or is changed to the communication possible status in which a communication can take place. At step S2-2, the information transfer control unit 22 provided in the user frame process block 20A detects such a change of the PVC link and notifies the charge information management unit 24 of the detection of a change. At step S2-3, the immediate charge-notification control unit 26 executes the charging control process, and obtain, from the charge information management unit 24, the quantity of information transferred after the previous notification. At step S2-4, the unit 26 generates the immediate charge-notification element 21c-1 or the immediate charge-notification element 21d-1, and edits the PVC status notification message 21c or the PVC charge notification message 21d so that the element 21c-1 or 21d-1 is included in the message 21c or 21d.

At step S2-5, the in-channel signal control unit 28 receives the PVC status notification message 21c or the PVC charge notification message 21d from the immediate charge-notification unit 26, and sends it to the terminal 31A. Then, the in-channel signal control unit 28 ends the LMI message control process at step S2-6.

According to the second operation, the terminal 31A can be notified of the charge information each time a change of the PVC link occurs. The terminal 31A can be notified of the charge information without sending the PVC status enquiry message 21a or the PVC charge enquiry message 21b. In this regard, the charge notification process by the second operation can be said an asynchronous process.

Figure 15:
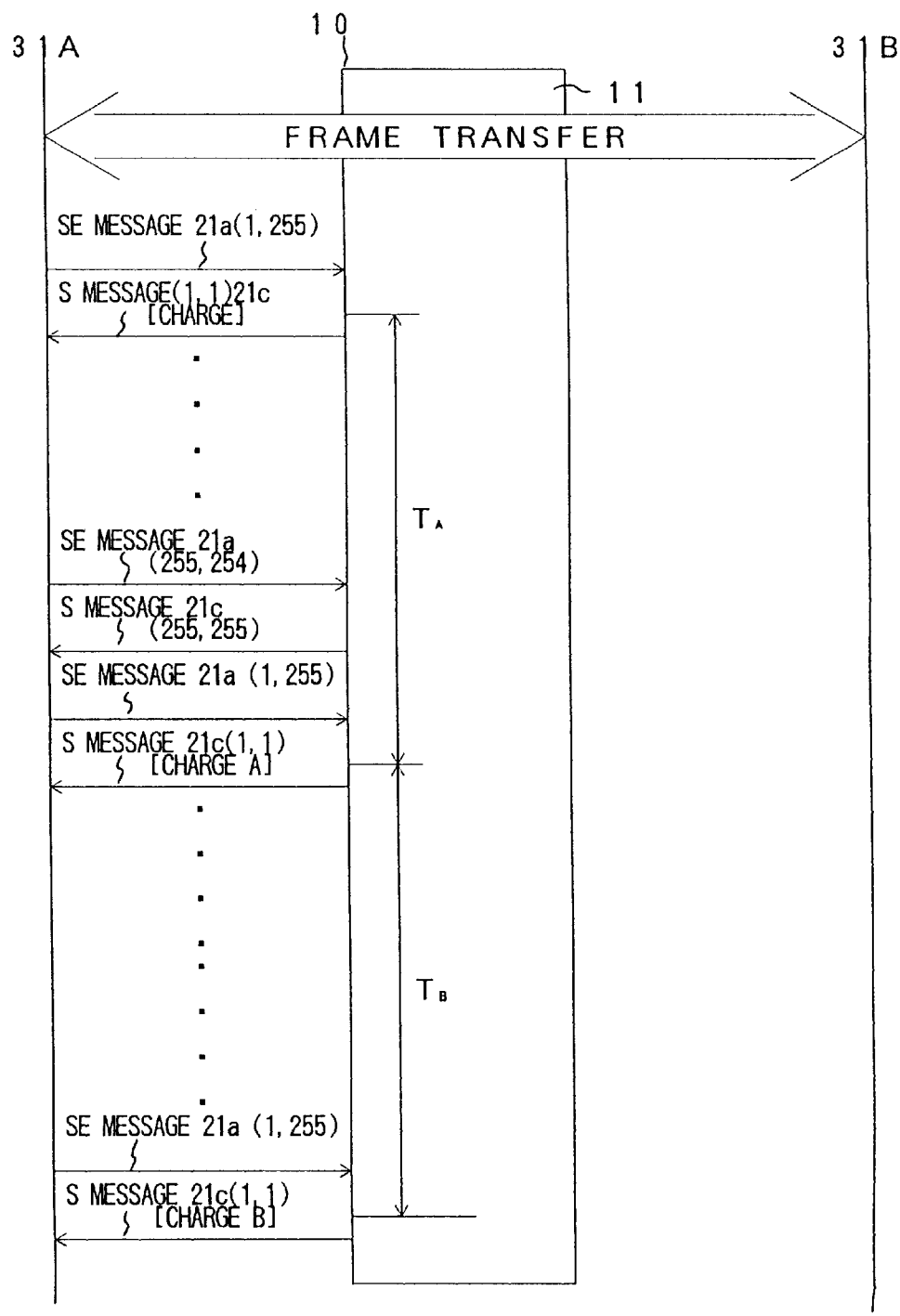
FIG. 15 is a sequence chart of a third operation of the embodiment of the present invention.
Figure 16:
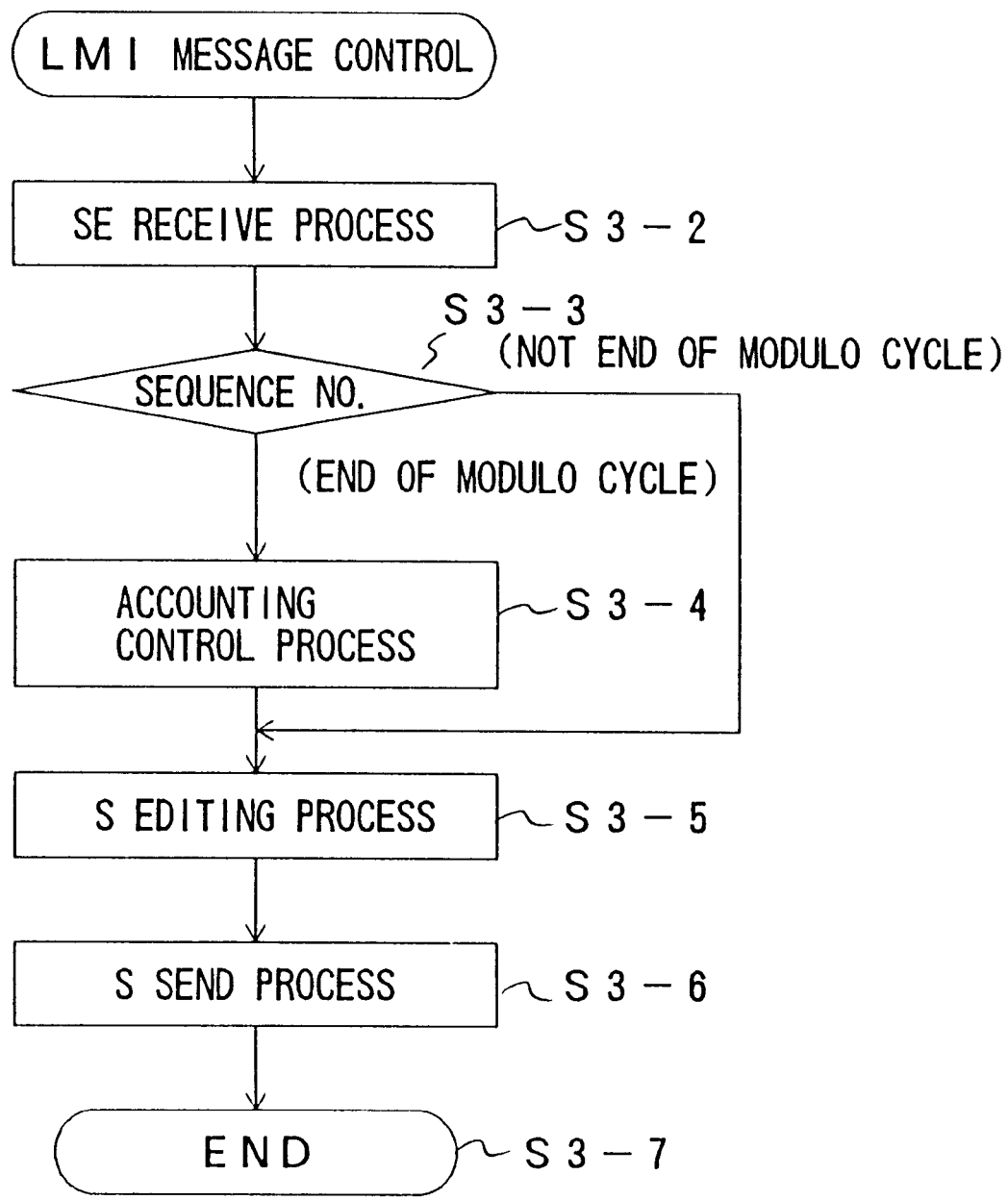
FIG. 16 is a flowchart of a control process for realizing the third operation shown in FIG. 15.

FIG. 15 is a sequence chart of the third operation of the embodiment of the present invention, and FIG. 16 is a flowchart of an immediate charge-notification control process for realizing the sequence shown in FIG. 15. The third operation utilizes a module cycle of the sequence number contained in each message transferred between the terminal 31A and the frame relay switching device 10. The sequence number of each message is defined as (x, y). In one rotation of the parameter y (equal to, for example, 10 seconds), the value thereof changes from 1 to 255 serially. The modulo cycle of the sequence number is equal to 256 rotations of the parameter y, while the value of the parameter x changes from 1 to 255 serially. When it takes 10 seconds to complete one rotation of the parameter y, the modulo cycle of the sequence number is equal to 2,560 seconds.

As shown in FIG. 15, the PVC status enquiry message (SE) 21a changes from (1, 1) to (255, 255) during a period $T_A$. The message 21a changes in the same manner as described above during a subsequent period $T_B$. Each time the frame relay switching device 10 receives the PVC status enquiry message 21a (1, 255), the device 10 sends the terminal 31A the PVC status notification message 21c including the charge information. For example, the PVC status notification message 21c in response to the message 21a sent in the period $T_A$ includes charge information A indicative of the difference between the charge for the period $T_A$ and the charge for the previous period.

Referring to FIG. 16, each time the PVC status enquiry message 21a is received from the terminal 31A at step S3-2, the in-channel signal control unit 28 checks the sequence number and determines whether the received message 21 indicates the end of the modulo cycle at step S3-3. When it is determined that the received PVC status enquiry message 21a does not indicate the end of the module cycle, the editing process for editing the PVC status notification message 21c including no charge information is carried out at step S3-5. At step S3-6, the PVC status notification message 21c is sent to the terminal 31A by the in-channel signal control unit 28.

When it is determined, at step S3-3, that the message received at step S3-2 indicates the end of the modulo cycle, the charging control process S3-4 is carried out in the previously-described manner so that charging information indicative of the quantity of information during the modulo cycle can be generated. The PVC status notification message 21c including the charge information is edited at step S3-5, and is sent at step S3-6 and the cycle ends at S3-7.

According to the third operation, the terminal 31A can be periodically notified of the charge information.

Figure 17:
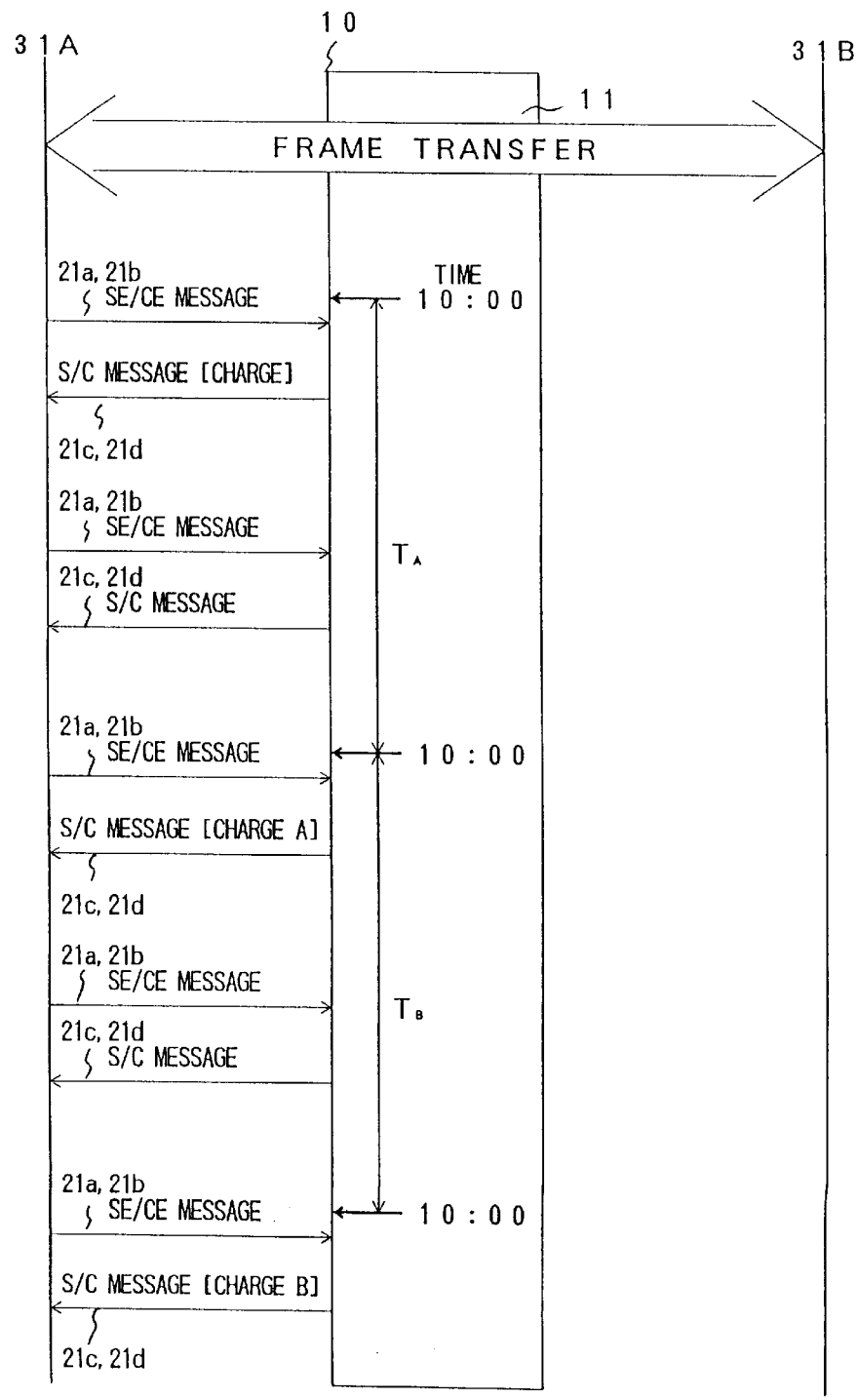
FIG. 17 is a sequence chart of a fourth operation of the embodiment of the present invention.
Figure 18:
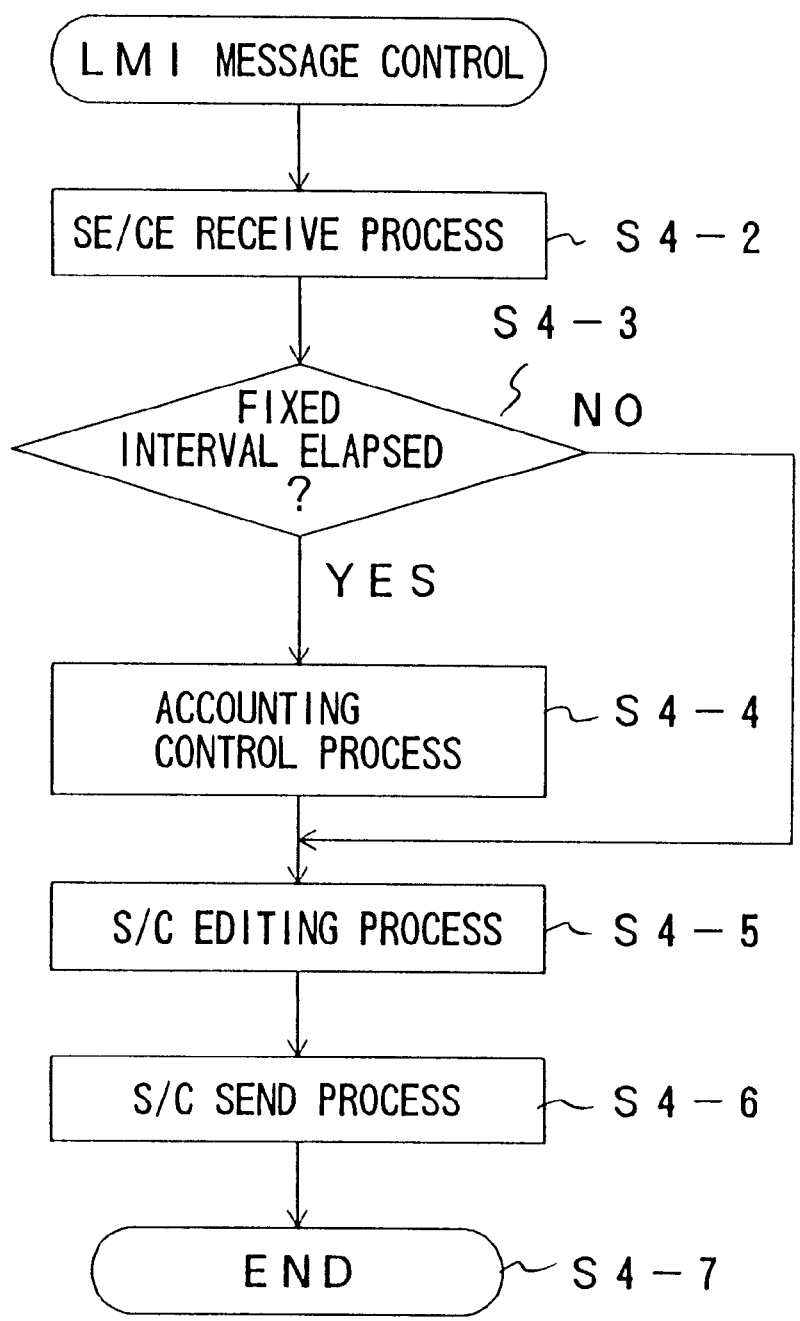
FIG. 18 is a flowchart of a control process for realizing the fourth operation shown in FIG. 17.

FIG. 17 is a sequence chart of the fourth operation of the embodiment of the present invention, and FIG. 18 is a flowchart of an immediate charge-notification control process for realizing the sequence shown in FIG. 17. The fourth operation is directed to periodically notifying the terminal 31A of the charge information at a fixed interval. In the case shown in FIG. 17, the terminal 31A is notified of the charge information at an interval equal to 24 hours ($T_A=T_B=24$ hours). More particularly, the terminal 31A is notified of the charge information at 10:00 every day.

Referring to FIG. 18, each time the PVC status enquiry message 21a or the PVC charge enquiry message 21b is received at step S4-2, the in-channel signal control unit 28 determines, at step S4-3, whether the fixed interval has elapsed. The unit 28 includes a timer, which is referred to at step S4-3. When it is determined that the fixed interval has not elapsed, step S4-5 is carried out so that the PVC status notification message 21c or the PVC charge notification message 21d is edited. It will be noted that no charge information is included in the PVC charge notification message 21d because the accounting control process of step S4-4 is not executed. Hence, the terminal 31A is not notified of charge information even when it sends the PVC charge enquiry message 21d to the frame relay switching device 11. In an alternative, it is possible to execute step S4-4 and send the PVC charge notification message 21d including charge information to the terminal 31A if the PVC charge enquiry message 21b is received. For example, charge information concerning the just completed communication can be sent to the terminal 31A, separately from charge information to be sent when the fixed interval has elapsed.

When it is determined, at step S4-3, that the given interval has elapsed, the accounting control process is executed at step S4-4 by the immediate charge-notification unit 26, so that the quantity of information transferred during the given interval can be calculated. Then, the editing process is carried out at step S4-5 and then the sending process is carried out at step S4-6 in the same manner as described before. Then, the control is ended at step S4-7.

In the case shown in FIG. 17, the PVC status notification message 21c or the PVC charge notification message 21d including charge information A indicative of the cost for the period $T_A$ is sent when interval $T_A$ has just elapsed. Similarly, the PVC status notification message 21c or the PVC charge notification message 21d including charge information B indicative of the cost for the period $T_B$ is sent when interval $T_B$ has just elapsed.

According to the fourth operation, the terminal 31A can be periodically notified of the charge information. Alternatively, it is possible to send the notification message 21c or 21d in asynchronism with the message 21a or 21b. That is, the notification message 21c or 21d can be sent to the terminal 31A each time the given interval has elapsed irrespective of whether the message 21a or 21b is received.

Figure 19:
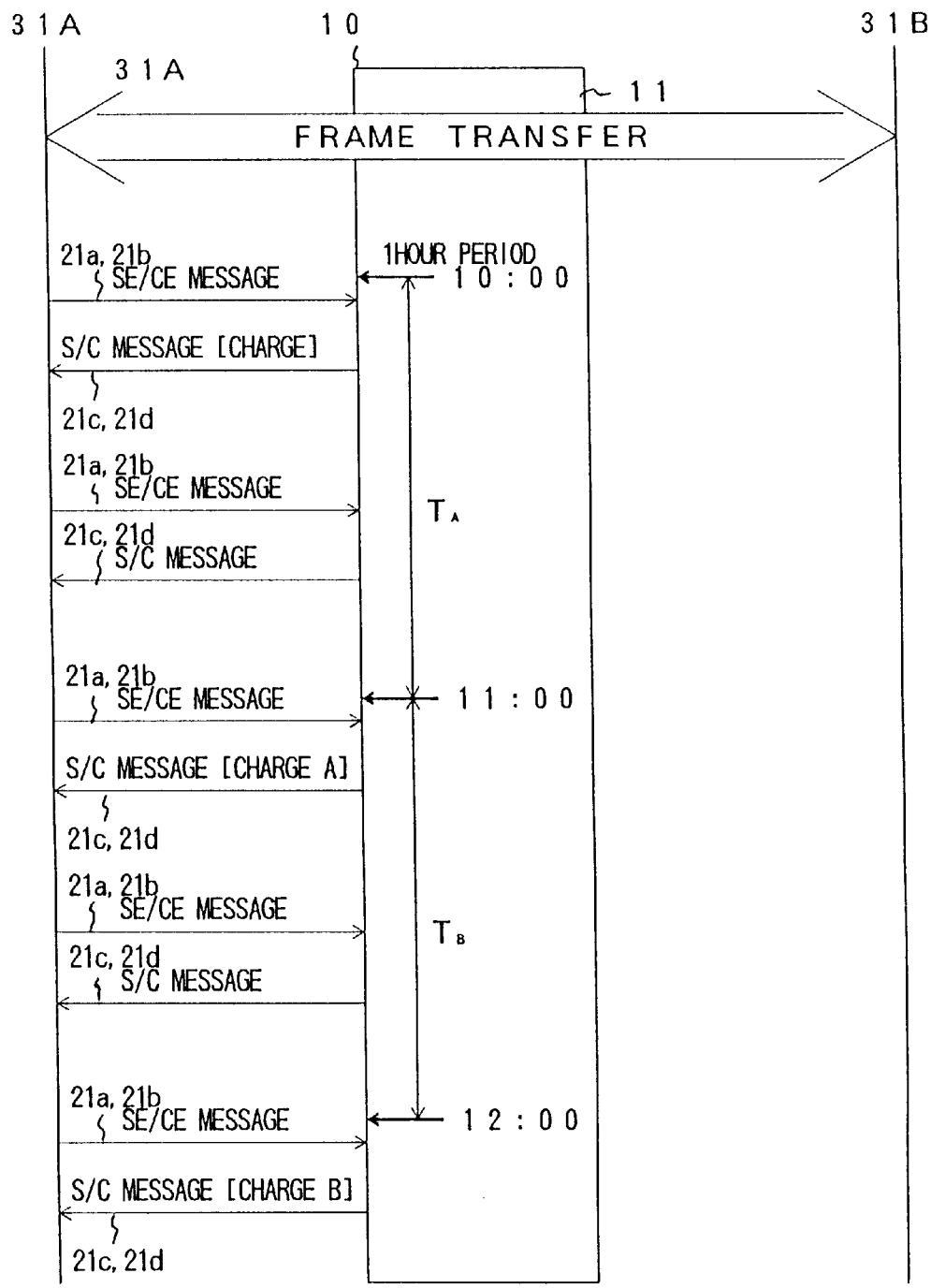
FIG. 19 is a sequence chart of a fifth operation of the embodiment of the present invention.
Figure 20:
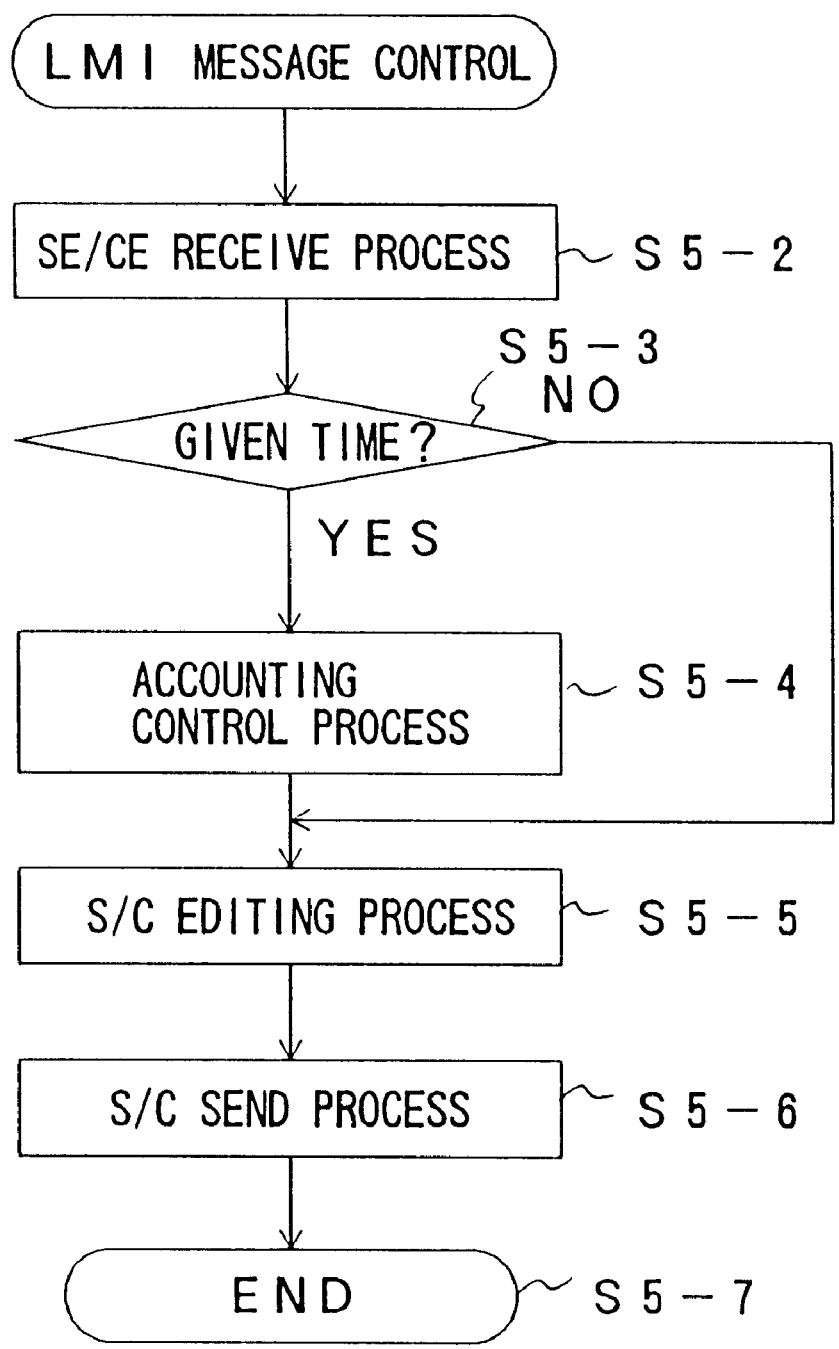
FIG. 20 is a flowchart of a control process for realizing the fifth operation shown in FIG. 19.

FIG. 19 is a sequence chart of the fifth operation of the embodiment of the present invention, and FIG. 20 is a flowchart of an immediate charge-notification control process for realizing the sequence shown in FIG. 19. The fifth operation is directed to periodically notifying the terminal 31A of the charge information at a given time. In the case shown in FIG. 19, the terminal 31A is notified of the charge information every hour ($T_A=T_B=1$ hour).

Referring to FIG. 20, each time the PVC status enquiry message 21a or the PVC charge enquiry message 21b is received at step S5-2, the in-channel signal control unit 28 determines, at step S5-3, whether the present time is one of the given times such as 01:00, 02:00 . . . 23:00 and 24:00. The unit 28 includes a clock, which is referred to at step S5-3. When it is determined that the present time is not one of the given times, step S5-5 is carried out so that the PVC status notification message 21c or the PVC charge notification message 21d is edited. It will be noted that no charge information is included in the PVC charge notification message 21d because the accounting control process of step S5-4 is not executed. Hence, the terminal 31A is not notified of charge information even when it sends the PVC charge enquiry message 21d to the frame relay switching device 11. In an alternative, it is possible to execute step S5-4 and send the PVC charge notification message 21d including charge information to the terminal 31A if the PVC charge enquiry message 21b is received. For example, charge information concerning the just completed communication can be sent to the terminal 31A, separately from charge information to be sent at each given time.

When it is determined, at step S5-3, that the current time is one of the given times, the accounting control process is executed at step S5-4 by the immediate charge-notification unit 26, so that the quantity of information transferred during the given interval can be calculated. Then, the editing process is carried out at step S5-5 and then the sending process is carried out at step S5-6 in the same manner as described before. Then, the control is ended at step S5-7.

In the case shown in FIG. 19, the PVC status notification message 21c or the PVC charge notification message 21d including charge information A indicative of the cost for the period $T_A$ (equal to one hour) is sent at 11:00. Similarly, the PVC status notification message 21c or the PVC charge notification message 21d including charge information B indicative of the cost for the period $T_B$ is sent at 12:00.

According to the fifth operation, the terminal 31A can be periodically notified of the charge information at the given times. Alternatively, it is possible to send the notification message 21c or 21d in asynchronism with the message 21a or 21b. That is, the notification message 21c or 21d can be sent to the terminal 31A at each given time irrespective of whether the message 21a or 21b is received.

According to the first through fifth operations of the embodiment of the present invention, the terminal 31A can be notified of charge information periodically or at a given timing by using the enquiry messages 21a and/or 21b and/or the notification messages 21c and/or 21d, as described above.

The above-mentioned embodiment of the present invention utilizes a frame relay network including frame relay switching devices. Alternatively, it is possible to perform the immediate charge-notification process for an ATM (cell relay) network including ATM switching devices. In the ATM network, a fixed-length cell called ATM cell is used. The ATM cell consists of 53 bytes including a 5-byte header and a 48-byte information field.

The present invention makes it possible for each terminal to be notified of charge information on a permanent link at a desired time. Hence, it is possible to satisfy various demands of the subscribers regarding notification of charges. Hence, it becomes possible to easily manage the charge for each terminal (installed in branch offices of a company).

The present invention is not limited to the specifically disclosed embodiments, and variations and modifications may be made without departing from the scope of the present invention.

What is claimed is:

1. A data switching device comprising:
    a switch which performs a switch operation on data transferred via the data switching device, said switch forming a permanent link connecting first and second terminals permanently via a network;
    a charge information management unit separate from the terminals, which unit manages charge information concerning a quantity of information transferred between said first and second terminals via the permanent link; and
    a control unit which receives said charge information and sends one of the first and second terminals a notification message including said charge information according to a predetermined sequence.

2. The data switching device as claimed in claim 1, wherein said control unit sends the notification message when a sequence number contained in a message sent from said one of the terminals to the data switching device reaches a predetermined value.

3. The data switching device as claimed in claim 1, wherein said charge information indicates a charge for information transferred since a last notification of the charge information.

4. The data switching device as claimed in claim 1, wherein said control unit sends the notification message when a status of the permanent link changes.

5. The data switching device as claimed in claim 4, wherein said control unit sends said notification message in response to receipt of an enquiry message periodically sent from said one of the terminals.

6. The data switching device as claimed in claim 1, wherein said control unit sends the notification message at a given interval.

7. The data switching device as claimed in claim 6, wherein said control unit sends the notification message at the given interval in response to receipt of an enquiry message sent from said one of the terminals.

8. The data switching device as claimed in claim 1, wherein said control unit sends the notification message at a given time.

9. The data switching device as claimed in claim 8, wherein said control unit sends the notification message at the given time in response to receipt of an enquiry message sent from said one of the terminals.

10. The data switching device as claimed in claim 1, wherein said control unit sends said notification message in response to receipt of an enquiry message periodically sent from said one of the terminals.

11. The data switching device as claimed in claim 10, wherein said enquiry message is a message which enquires a status of said permanent link.

12. The data switching device as claimed in claim 10, wherein said enquiry message is a message which enquiries a charge for a transfer of information.

13. A charge information notifying method for a network including a data switching device including a switch which performs a switch operation on data transferred via the data switching device, said switch forming a permanent link connecting first and second terminals permanently via a network, said method comprising the steps of:
    (a) managing separate from the terminals charge information concerning a quantity of information transferred between said first and second terminals via the permanent link; and
    (b) providing a control unit which receives said charge information and sending from said control unit to one of the first and second terminals a notification message including said charge information according to a predetermined sequence.

14. The charge information notifying method as claimed in 13, wherein the step (b) comprises a step of sending the notification message when a sequence number contained in a message sent from said one of the terminals to the data switching device reaches a predetermined value.

15. The charge information notifying method as claimed in claim 13, wherein said charge information indicates a charge for information transferred since a last notification of the charge information.

16. The charge information notifying method as claimed in claim 13, wherein the step (b) comprises a step of sending the notification message when a status of the permanent link changes.

17. The charge information notifying method as claimed in 16, wherein the step (b) comprises a step of sending said notification message in response to receipt of an enquiry message periodically sent from said one of the terminals.

18. The charge information notifying method as claimed in claim 13, wherein the step (b) comprises a step of sending the notification message at a given interval.

19. The charge information notifying method as claimed in claim 18, wherein the step (b) comprises a step of sending the notification message at the given interval in response to receipt of an enquiry message sent from said one of the terminals.

20. The charge information notifying method as claimed in claim 13, wherein the step (b) comprises a step of sending the notification message at a given time.

21. The charge information notifying method as claimed in claim 20, wherein the step (b) comprises a step of sending the notification message at the given time in response to receipt of an enquiry message sent from said one of the terminals.

22. The charge information notifying method as claimed in claim 13, wherein the step (a) comprises a step of sending said notification message in response to receipt of an enquiry message periodically sent from said one of the terminals.

23. The charge information notifying method as claimed in claim 22, wherein said enquiry message is a message which enquiries a status of said permanent link.

24. The charge information notifying method as claimed in claim 22, wherein said enquiry message is a message which enquiries a charge for a transfer of information.

* * * * *